(12) United States Patent
Joo

(10) Patent No.: US 11,029,803 B2
(45) Date of Patent: Jun. 8, 2021

(54) ROBOT

(71) Applicant: LG ELECTRONICS INC., Seoul (KR)

(72) Inventor: Shinyung Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/794,919

(22) Filed: Feb. 19, 2020

(65) Prior Publication Data

US 2021/0089172 A1    Mar. 25, 2021

(30) Foreign Application Priority Data

Sep. 23, 2019 (KR) .................. 10-2019-0116760

(51) Int. Cl.
| | | |
|---|---|---|
| *G06F 3/048* | (2013.01) | |
| *G06F 3/0481* | (2013.01) | |
| *G06F 3/16* | (2006.01) | |
| *G06F 3/0488* | (2013.01) | |

(52) U.S. Cl.
CPC .......... *G06F 3/0481* (2013.01); *G06F 3/0488* (2013.01); *G06F 3/167* (2013.01)

(58) Field of Classification Search
CPC ....... G06F 3/0481; G06F 3/0488; G06F 3/167
USPC ....................................................... 715/727
See application file for complete search history.

(56) References Cited

U.S. PATENT DOCUMENTS

| | | | | |
|---|---|---|---|---|
| 10,226,866 B2* | 3/2019 | Thapliya | ................ | B25J 9/0003 |
| 10,513,038 B2* | 12/2019 | Thapliya | ................ | B25J 11/008 |
| 2011/0118870 A1* | 5/2011 | Sugihara | ................ | G06N 3/008 |
| | | | | 700/245 |
| 2012/0022688 A1* | 1/2012 | Wong | ..................... | G06N 3/008 |
| | | | | 700/253 |
| 2014/0095007 A1* | 4/2014 | Angle | ..................... | B25J 5/007 |
| | | | | 701/23 |
| 2017/0080564 A1* | 3/2017 | Dalibard | ................ | B25J 9/1656 |
| 2017/0100842 A1* | 4/2017 | Le Borgne | ............. | B25J 9/1694 |
| 2017/0113353 A1* | 4/2017 | Monceaux | ............. | G10L 15/26 |
| 2017/0120446 A1* | 5/2017 | Veltrop | ................ | B25J 9/1661 |
| 2017/0266812 A1* | 9/2017 | Thapliya | .............. | B25J 11/0005 |
| 2019/0193273 A1* | 6/2019 | Favis | ................. | G06F 16/2379 |
| 2020/0369333 A1* | 11/2020 | Lavalley | ............. | B25J 11/0015 |

FOREIGN PATENT DOCUMENTS

| | | | | | |
|---|---|---|---|---|---|
| CN | 110520257 A | * | 11/2019 | ............. | B25J 19/00 |
| CN | 110520258 A | * | 11/2019 | ............... | A63H 3/52 |

* cited by examiner

*Primary Examiner* — David Phantana-angkool
(74) *Attorney, Agent, or Firm* — KED & Associates, LLP

(57) ABSTRACT

Disclosed herein is a robot including at least one of a display or a speaker, at least one sensor configured to detect a physical stimulus, and a processor configured to detect a first physical stimulus based on a first sensing value acquired from the at least one sensor and output a first interface representing a first emotion corresponding to the first physical stimulus via at least one of the display or the speaker. The processor is configured to detect repetition of the first physical stimulus based on at least one sensing value sequentially acquired from the at least one sensor and output an interface representing an emotion equal to or different from the first emotion via at least one of the display or the speaker, whenever the repeated first physical stimulus is detected.

20 Claims, 13 Drawing Sheets

ROBOT

CROSS-REFERENCE TO RELATED APPLICATION

This application claims priority under 35 U.S.C. § 119 to Korean Application No. 10-2019-0116760 filed on Sep. 23, 2019, whose entire disclosure is hereby incorporated by reference.

BACKGROUND

1. Field

The present disclosure relates to a robot and, more particularly, to a robot for outputting various emotional expressions in response to a physical stimulus applied by a user.

2. Background

A robot may refer to a machine that automatically processes or operates a given task by its own ability. The application fields of robots are generally classified into industrial robots, medical robots, aerospace robots, and underwater robots. Recently, communication robots that can communicate with humans by voices or gestures have been increasing.

Such communication robots may include various types of robots such as a guidance robot disposed at a particular place to show various types of information to users and a home robot provided in the home. In addition, the communication robots may include an educational robot for guiding or assisting study of a learner through interaction with the learner.

The communication robot may be implemented to perform interaction with a user or a learner using various components. For example, the communication robot may include a microphone for acquiring sound generated around the robot or a camera for acquiring an ambient image of the robot.

Meanwhile, a manufacturer provides a function for outputting an interface (a facial expression, sound, etc.) corresponding to the emotion of a robot according to predetermined input or event occurrence through a display or a speaker, in order to more vividly implement the robot. However, since a conventional robot outputs only a limited number of interfaces in response to the same input or event, the same emotional changes as a person may not be smoothly expressed.

BRIEF DESCRIPTION OF THE DRAWINGS

The embodiments will be described in detail with reference to the following drawings in which like reference numerals refer to like elements wherein.

DETAILED DESCRIPTION

Figure 1:
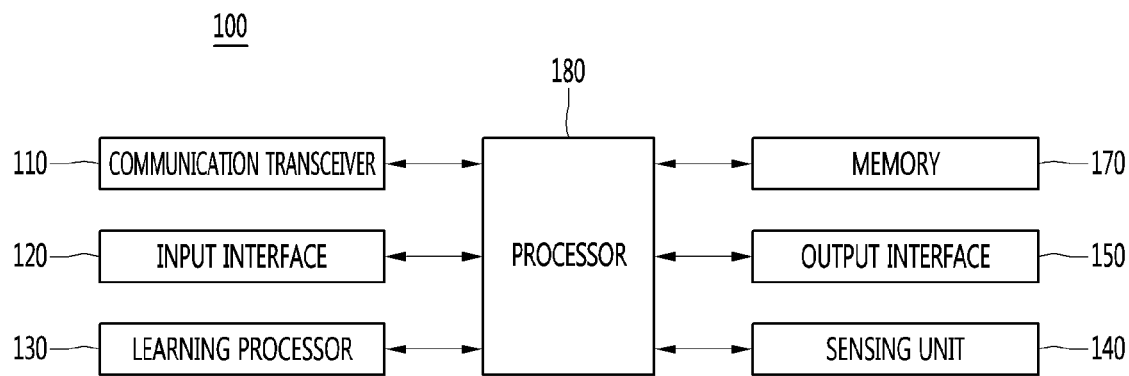
FIG. 1 illustrates an AI device including a robot according to an embodiment of the present disclosure.

Description will now be given in detail according to exemplary embodiments disclosed herein, with reference to the accompanying drawings. The accompanying drawings are used to help easily understand the embodiments disclosed in this specification and it should be understood that the embodiments presented herein are not limited by the accompanying drawings. As such, the present disclosure should be construed to extend to any alterations, equivalents and substitutes in addition to those which are particularly set out in the accompanying drawings.

A robot may refer to a machine that automatically processes or operates a given task by its own ability. In particular, a robot having a function of recognizing an environment and performing a self-determination operation may be referred to as an intelligent robot. Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method. The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an artificial intelligence (AI) device including a robot according to an embodiment of the present disclosure. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication transceiver 110, an input interface 120, a learning processor 130, a sensing unit 140, an output interface 150, a memory 170, and a processor 180. The communication transceiver 110 may transmit and receive data to and from external devices such as other AI devices 100a to 100e and the AI server 200 by using wire/wireless communication technology. For example, the communication transceiver 110 may transmit and receive sensor information, a user input, a learning model, and a control signal to and from external devices.

The communication technology used by the communication transceiver 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data. At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation. At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors. Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense. At this time, the output interface 150 may include a display for outputting time information, a speaker for outputting auditory information, and a haptic interface for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device. The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language. At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
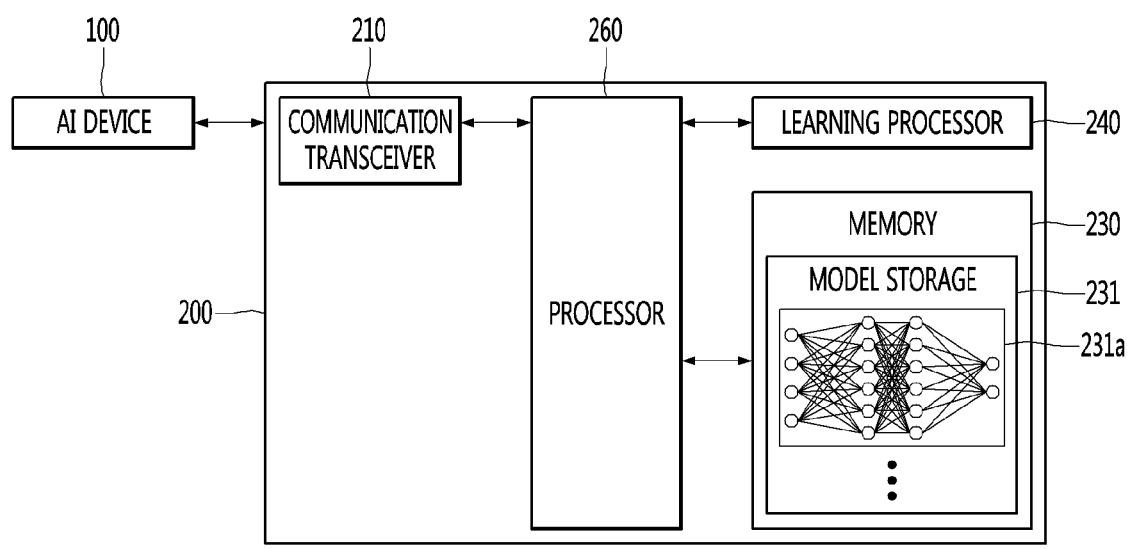
FIG. 2 illustrates an AI server connected to a robot according to an embodiment of the present disclosure.

FIG. 2 illustrates an AI server connected to a robot according to an embodiment of the present disclosure. Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication transceiver 210, a memory 230, a learning processor 240, a processor 260, and the like. The communication transceiver 210 can transmit and receive data to and from an external device such as the AI device 100. The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230. The processor 260 may infer the result value for new input data by using the learning model and may generate a response or a control command based on the inferred result value.

Figure 3:
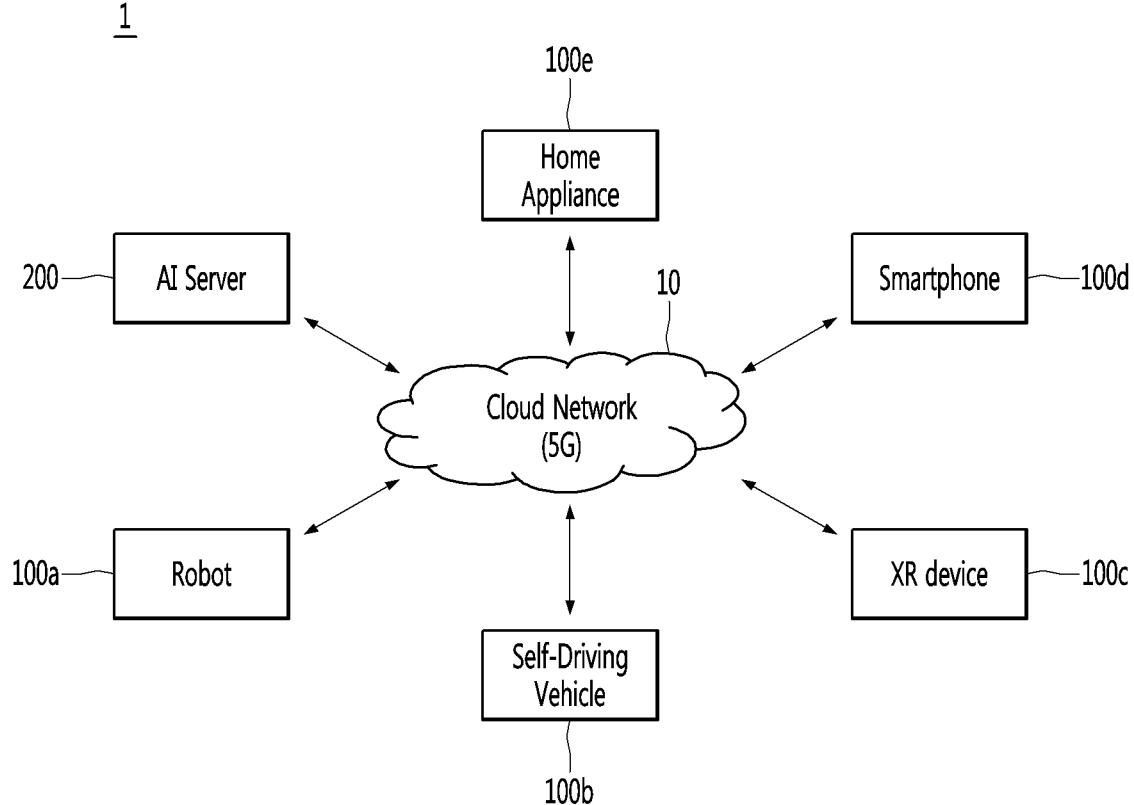
FIG. 3 illustrates an AI system including a robot according to an embodiment of the present disclosure.

FIG. 3 illustrates an AI system 1 according to an embodiment of the present disclosure. Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network. That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data. The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e. Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like. The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation. The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation. The robot 100a may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

Figure 4:
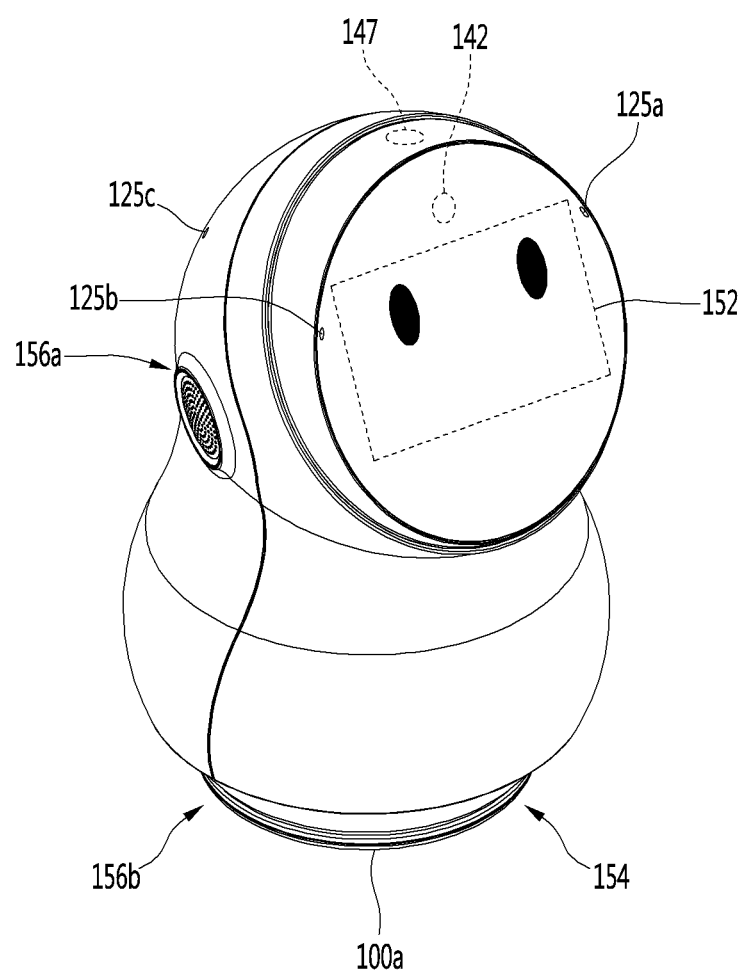
FIG. 4 is a perspective view of a robot according to an embodiment of the present disclosure.

FIG. 4 is a perspective view of a robot according to an embodiment of the present disclosure. Referring to FIG. 4, the robot 100*a* may refer to a communication robot for providing information or content to a user through communication or interaction with the user or performing operation of inducing a particular action.

For example, the robot 100*a* may be a home robot disposed in the home. Such a home root may perform operation of providing various types of information or content to the user through interaction with a user or monitoring an event occurring in the home.

In order to perform the above-described operation, the robot 100*a* may include input/output interfaces such as a camera 142 for acquiring an image of a user or an ambient image of a robot, at least one microphone 124 (see FIG. 5) for acquiring user's speech or ambient sound of the robot, a touch sensor 147 for detecting touch of a part (e.g., a finger) of the body of the user, a display 152 for outputting graphics or text, a speaker 154 for outputting speech or sound, and a light output unit 156 for outputting light of a color or pattern mapped to a particular event or situation.

The robot 100*a* may include at least one microphone holes 125*a* to 125*c* formed in an outer surface of a cover (or a case), in order to smoothly acquire external sound of the robot through the at least one microphone 124 implemented therein. Each of the microphone holes 125*a* to 125*c* may be formed at a position corresponding to any one microphone 124, and the microphone 124 may communicate with the outside through the microphone holes 125*a* to 125*c*. Meanwhile, the robot 100*a* may include a plurality of microphones spaced apart from each other. In this case, the robot 100*a* may detect a direction in which sound is generated using the plurality of microphones.

The display 152 may be disposed to face one surface from the robot 100*a*. Hereinafter, a direction that the display 152 faces is defined as a front side of the robot 100*a*. Meanwhile, although the speaker 154 is shown as being disposed at the lower portion of the robot 100*a*, the position of the speaker 154 may be variously changed according to embodiments.

The light output unit 156 is implemented as a light source such as a light emitting diode (LED) to represent the state or event of the robot 100*a* through a color or output pattern change. Although first light output units 156*a* disposed at both surfaces of the robot 100*a* and a second light output unit 156*b* disposed at the lower portion of the robot 100*a* are shown in FIG. 4, the number of light output units 156 and the placement positions thereof may be variously changed.

Although not shown, the robot 100*a* may further include a movement unit (driving unit or traveling unit) for moving one position to another position. For example, the movement unit may include at least one wheel and a motor for rotating the wheel.

Figure 5:
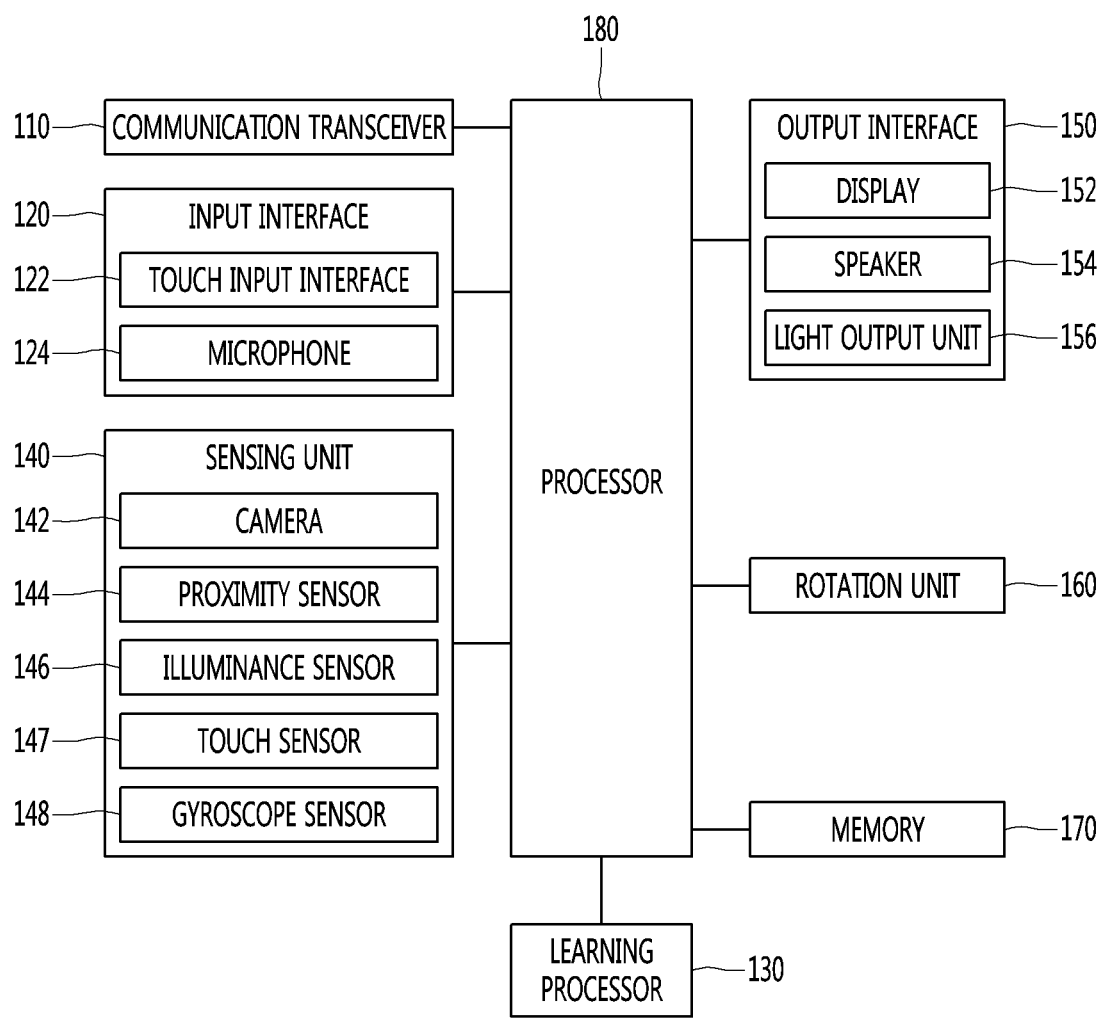
FIG. 5 is a view showing the control configuration of a robot according to an embodiment of the present disclosure.

FIG. 5 is a block diagram showing the control configuration of a robot according to an embodiment of the present disclosure. Referring to FIG. 5, the robot 100*a* may include a communication transceiver 110, an input interface 120, a learning processor 130, a sensing unit 140, an output interface 150, a rotation unit 160, a memory 170 and a processor 180. The components shown in FIG. 5 are examples for convenience of description and the robot 100*a* may include more or fewer components than the components shown in FIG. 5. Meanwhile, the description related to the AI device 100 of FIG. 1 is similarly applicable to the robot 100*a* of the present disclosure and thus a repeated description of FIG. 1 will be omitted.

The communication transceiver 110 (or a communication interface) may include communication modules for connecting the robot 100*a* with a server, a mobile terminal and another robot over a network. Each of the communication modules may support any one of the communication technologies described above with reference to FIG. 1.

For example, the robot 100*a* may be connected to the network through an access point such as a router. Therefore, the robot 100*a* may provide various types of information acquired through the input interface 120 or the sensing unit 140 to the server or the mobile terminal over the network. The information transmitted to the server may be stored in the server or transmitted to another electronic device (a mobile terminal, a robot, etc.) connected to the server.

The input interface 120 (or an input interface) may include at least one input parts for acquiring various types of data. For example, the at least one input parts may include a physical input interface such as a button or a dial, a touch input interface 122 such as a touchpad or a touch panel, a microphone 124 for receiving user's speech or ambient sound of the robot 100*a*. In some embodiments, the touch input interface 122 may be implemented in the form of a touchscreen along with the display 152. The user may input various types of requests or commands to the robot 100*a* through the input interface 120.

Meanwhile, the processor 180 may transmit speech data of the user received through the microphone 124 to the server via the communication transceiver 110. The server may analyze the speech data, recognize a wakeup word, a command word, a request, etc. in the speech data, and provide a result of recognition to the robot 100*a*. In some embodiments, the server may be implemented as the AI server 200 described above with reference to FIG. 2. In this case, the server may recognize the wakeup word, the command word, the request, etc. in the speech data via a model (artificial neural network 231*a*) trained through the learning processor 240. The processor 180 may switch an operation mode or process the command word or the request based on the result of recognition.

In some embodiments, the processor 180 may directly recognize the wakeup word, the command word, the request, etc. in the speech data via a model trained by the learning processor 130 in the robot 100*a*. Alternatively, the processor 180 may receive data corresponding to the trained model from the server, store the data in the memory 170, and recognize the wakeup word, the command word, the request, etc. in the speech data via the stored data.

The sensing unit 140 may include at least one sensor for sensing a variety of ambient information of the robot 100*a*.

For example, the sensing unit 140 may include a camera 142 and various sensors such as a proximity sensor 144, an illuminance sensor 146, a touch sensor 147 and a gyro sensor (gyroscope) 148.

The camera 142 may acquire the ambient image of the robot 100a. In some embodiments, the processor 180 may acquire an image including a user's face through the camera 142 to recognize the user or acquire the gesture or facial expression of the user.

The proximity sensor 144 may detect that an object such as a user approaches the robot 100a. For example, when approaching of the user is detected by the proximity sensor 144, the processor 180 may output an initial screen or initial speech through the output interface 150, thereby inducing the user to use the robot 100a.

The illuminance sensor 146 may detect the brightness of a space in which the robot 100a is disposed. The processor 180 may control the components to perform various operations based on the result of detection of the illuminance sensor 146 and/or time-of-day information.

The touch sensor 147 may detect that a portion of the body of the user is brought into contact with a predetermined area of the robot 100a. For example, the touch sensor 147 may be disposed in the head of the robot 100a and, more particularly, above or behind a face area including the display 152, without being limited thereto.

The gyro sensor 148 may detect the rotation angle or the slope of the robot 100a. The processor 180 may recognize a direction that the robot 100a faces or detect external impact based on the result of detection of the gyro sensor 148. For example, the gyro sensor 148 may be provided in the body of the robot 100a, without being limited thereto.

The output interface 150 may output various types of information or content related to operation or state of the robot 100a or various types of services, programs or applications executed in the robot 100a. In addition, the output interface 150 may output various types of messages or information for performing interaction with the user.

The output interface 150 may include the display 152, the speaker 154 and the light output unit 156. The display 152 may output the above-described various types of information or messages in the graphic form. In some embodiments, the display 152 may be implemented as a touchscreen along with the touch input interface 122. In this case, the display 152 may perform an input function as well as an output function. The speaker 154 may output the various types of information or messages in the form of speech or sound.

The light output unit 156 may be implemented as a light source such as an LED. The processor 180 may represent the state of the robot 100a through the light output unit 156. In some embodiments, the light output unit 156 is an auxiliary output unit and may provide various types of information to the user along with the display 152 and/or the speaker 154.

The rotation unit 160 may include components (a motor, etc.) for rotating the robot 100a about a vertical axis. The processor 180 may control the rotation unit 160 to rotate the robot 100a, thereby changing the direction that the display 152 and the camera 142 of the robot 100a face. In some embodiments, the rotation unit 160 may further include components (a motor, etc.) for tilting the robot 100a by a predetermined angle in a forward-and-backward direction.

Various types of data such as control data for controlling operation of the components included in the robot 100a, data for performing operation based on information acquired through the input interface 120 or information acquired through the sensing unit 140, etc. may be stored in the memory 170.

In addition, program data of software modules or applications executed by at least one processor or controller included in the processor 180 may be stored in the memory 170. In addition, an interface representing an emotional expression of the robot 100a via the display 152 may be stored in the memory 170 according to the embodiment of the present disclosure. For example, the interface may include a graphical user interface (GUI) output via the display 152 and sound output via the speaker 154. The memory 170 may include various storage devices such as a ROM, a RAM, an EEPROM, a flash drive, a hard drive, etc. in hardware.

The processor 180 may include at least one processor or controller for controlling operation of the robot 100a. For example, the processor 180 may include at least one CPU, application processor (AP), microcomputer, integrated circuit, application specific integrated circuit (ASIC), etc.

Figure 6:
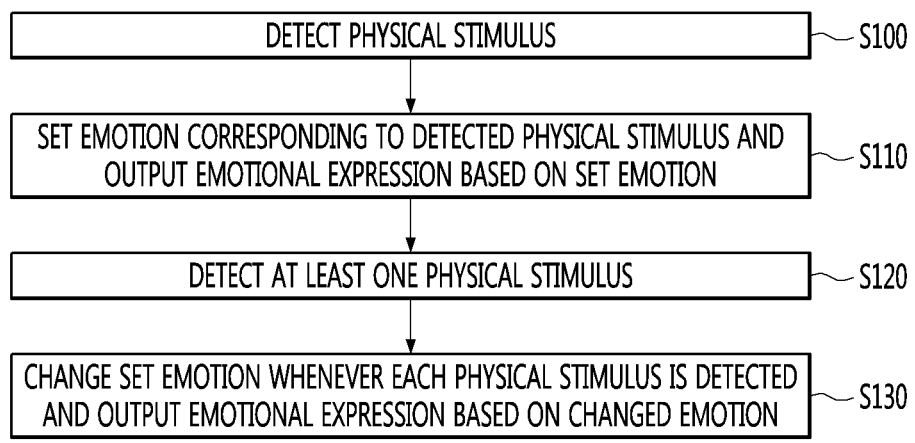
FIG. 6 is a flowchart illustrating schematic control operation of a robot according to an embodiment of the present disclosure.

FIG. 6 is a flowchart illustrating schematic control operation of a robot according to an embodiment of the present disclosure. Referring to FIG. 6, the robot 100a may detect a physical stimulus (S100). The processor 180 may detect a physical stimulus applied by a user, etc. using a physical stimulus detection sensor (e.g., the touch sensor 147, the gyro sensor 148, the touch input interface 122, etc.). The physical stimulus may include various types of stimuli such as short touch, long touch (stroking), push, shaking at predetermined positions of the robot 100a.

The processor 180 may detect the physical stimulus, by acquiring information on the type or position of the physical stimulus based on the sensing values of the physical stimulus detection sensor. The robot 100a may set the emotion of the robot 100a corresponding to the detected physical stimulus and output an emotional expression based on the set emotion (S110).

The processor 180 may set the emotion of the robot 100a based on the detected physical stimulus. The robot 100a may set the emotion according to various well-known emotion models. The emotion model may refer to a model representing respective characteristics (positive, negative, etc.) of or mutual relationship (intensity relationship, contrast relationship, etc.) between a plurality of emotions, and may be any one of well-known emotion models such as a Russell's circumplex model or Robert Plutchik's Wheel of Emotions.

For example, emotion information corresponding to the type and/or position of the physical stimulus may be stored in the memory 170. The processor 180 may acquire emotion information corresponding to the detected physical stimulus among the emotion information stored in the memory 170 and set the emotion of the robot 100a.

In addition, data (the respective characteristics of or mutual relationship between the plurality of emotions) related to the emotion model may be stored in the memory 170. In addition, at least one emotional expression information corresponding to each of the emotions of the robot 100a may be stored in the memory 170. For example, the emotional expression information may include an interface such as GUI data such as an image representing a facial expression, and/or sound data.

The processor 180 may acquire emotional expression information corresponding to a currently set emotion among the emotional expression information stored in the memory 170, and output an interface representing an emotional expression via the output interface 150 based on the acquired emotional expression information. The robot 100a may detect at least one physical stimulus (S120), and change the set emotion whenever each physical stimulus is detected, and output an emotional expression based on the changed emotion (S130).

The processor 180 may change (or maintain) the emotion currently set in the robot 100a based on the detected physical stimulus, whenever the physical stimulus is detected. For example, the processor 180 may not continuously output the same emotional expression, when the same physical stimulus is repeatedly detected. That is, the processor 180 may output various emotional expressions, by maintaining the set emotion or increasing or decreasing the intensity of the emotion based on the number of repetitions of the physical stimulus. Therefore, it is possible to maximize vividness of the robot 100a. An embodiment related thereto will be described below with reference to FIGS. 7 to 9.

In addition, when a physical stimulus different from a previously detected physical stimulus is detected, the processor 180 may not immediately change the emotion to an emotion corresponding to the detected other physical stimulus. For example, the processor 180 may represent a more natural emotional change of the robot 100a, by changing the emotion of the robot 100a according to a relationship between a currently set emotion and the other physical stimulus. An embodiment related thereto will be described below with reference to FIGS. 10 to 11.

Meanwhile, although not shown, the robot 100a may initialize the currently set emotion under a predetermined condition. Initializing the emotion may mean that the emotion of the robot 100a is switched to a neutral state. For example, the initialization condition of the emotion may include the case where a wakeup word, a command, a request, etc. is input via the input interface 120, the case where a predetermined event occurs in a program or application which is being driven in the robot 100a, the case where noise having a reference decibel or more is detected via the microphone 124, the case where the user of the robot 100a is switched via the input interface 120 or the sensing unit 140, the case where a physical stimulus is not detected during a reference time from a recent physical stimulus detection time point, etc.

Figure 7:
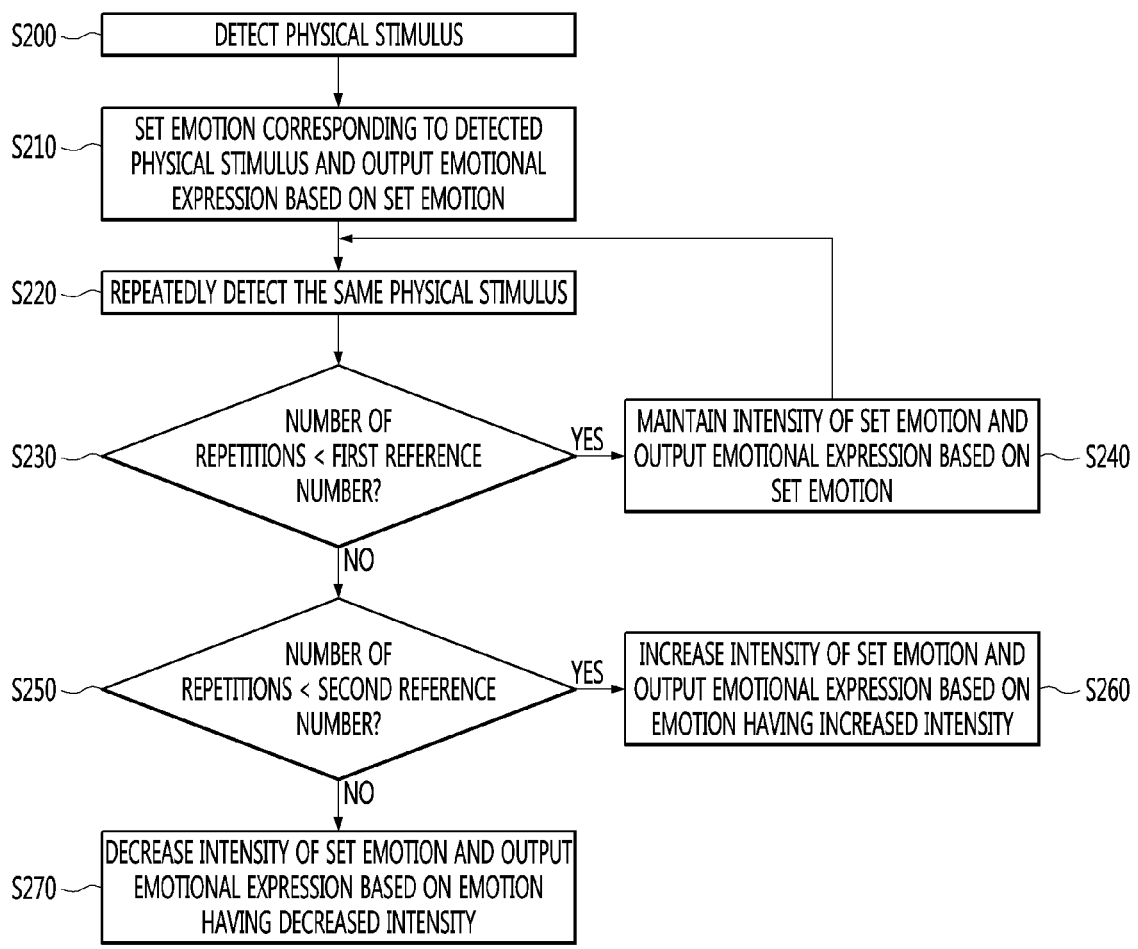
FIG. 7 is a flowchart illustrating operation in which the robot changes an emotion according to repetition of the same stimulus and outputs an emotional expression according to the changed emotion, in association with the control operation shown in FIG. 6.

FIG. 7 is a flowchart illustrating operation in which the robot changes an emotion according to repetition of the same stimulus and outputs an emotional expression according to the changed emotion, in association with the control operation shown in FIG. 6. Referring to FIG. 7, steps S200 and S210 are substantially equal to steps S100 and S110 of FIG. 6 and a description thereof will be omitted.

The robot 100a may repeatedly detect the same physical stimulus as the physical stimulus detected in step S200 (S220). The user may repeatedly apply the same type of physical stimulus to the robot 100a. In this case, the processor 180 may maintain or change the emotion based on the number of repetitions of the physical stimulus whenever the physical stimulus is detected, thereby providing a more vivid response.

Meanwhile, the same physical stimulus may include the case where the physical stimulus detection results from the sensing values are the same even if the sensing values of the above-described physical stimulus detection sensors (e.g., the touch sensor 147, the gyro sensor 148, the touch input interface 122, etc.) are not exactly the same. For example, the robot 100a may set at least one reference number associated with the number of repetitions of the same physical stimulus, and maintain the emotion or increase or decrease the intensity of the emotion according to an area divided according to the at least one reference number.

Specifically, when the number of repetitions of the physical stimulus is less than a first reference number (YES of S230), the processor 180 may maintain the intensity of the set emotion (S240). In the case of a person, there may be no or little emotional change during the initial repetition of a specific physical stimulus. Based on this, the processor 180 may repeatedly detect the same physical stimulus and maintain the intensity of the set emotion when the number of repetitions is less than the preset first reference number. In this case, when the physical stimulus is detected, the processor 180 may output an interface representing the emotional expression based on the maintained emotion via the output interface 150.

In some embodiments, a plurality of pieces of emotional expression information corresponding to the same emotion may be stored in the memory 170. The processor 180 may provide various types of emotional expressions even with respect to the same emotion, by outputting the interface using any of the plurality of pieces of emotional expression information corresponding to the maintained emotion when the physical stimulus is detected.

Meanwhile, when the number of repetitions of the physical stimulus is equal to or greater than the first reference number and is less than a second reference number (YES of S250), the processor 180 may increase the intensity of the set emotion (S260). In the case of a person, the emotion may be heightened as the same physical stimulus is repeated. For example, as a physical stimulus of touching a person's head is repeated, the emotion of the person may be gradually heightened in a negative direction.

Based on this, when the number of repetitions of the physical stimulus increases to be equal to or greater than the first reference number, the processor 180 may increase the intensity of the set emotion to heighten the emotion of the robot 100a.

Increasing the intensity of the emotion may mean changing to a more positive state (e.g., joy→ecstasy) in the case of a positive emotion and mean a more negative state (e.g., anxiety→fear) in the case of a negative emotion.

When the number of repetitions of the physical stimulus is equal to or greater than the first reference number, the processor 180 may output an interface representing the emotional expression based on the emotion having the increased intensity via the output interface 150. In contrast, when the number of repetitions of the physical stimulus is equal to or greater than the second reference number (NO of S250), the processor 180 may decrease the intensity of the set emotion (S270).

Meanwhile, when the same physical stimulus is repeated more than a certain number of times, a person may adapt to the physical stimulus and the emotion thereof may gradually change to a neutral state. Based on this, when the number of repetitions of the same physical stimulus increases to be equal to or greater than the second reference number, the processor 180 may gradually decrease the intensity of the set emotion, thereby stabilizing the emotion of the robot 100a.

Decreasing the intensity of the emotion may mean gradually changing from the positive or negative emotion to the neutral state. When the number of repetitions of the physical stimulus is equal to or greater than the second reference number, the processor 180 may output an interface representing the emotional expression based on the emotion having the decreased intensity via the output interface 150.

Hereinafter, examples related to change in emotional expression of the robot 100a according to repetition of the same physical stimulus will be described with reference to FIGS. 8a to 9d. FIGS. 8a to 8d are views showing an example related to operation of the robot shown in FIG. 7.

Figure 8A:
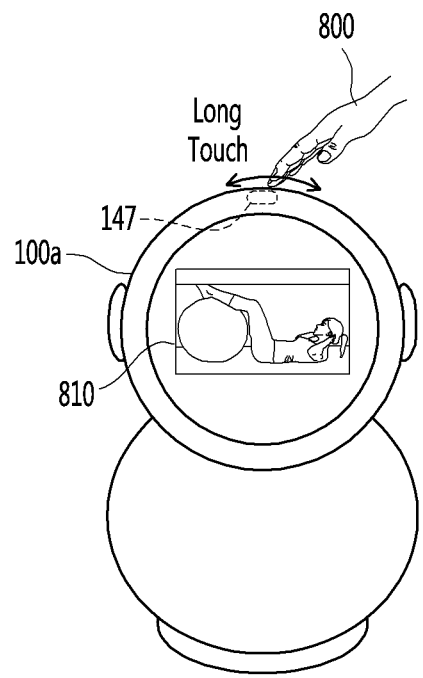
FIGS. 8A to 8D are views showing an example related to operation of the robot shown in FIG. 7.
Figure 8B:
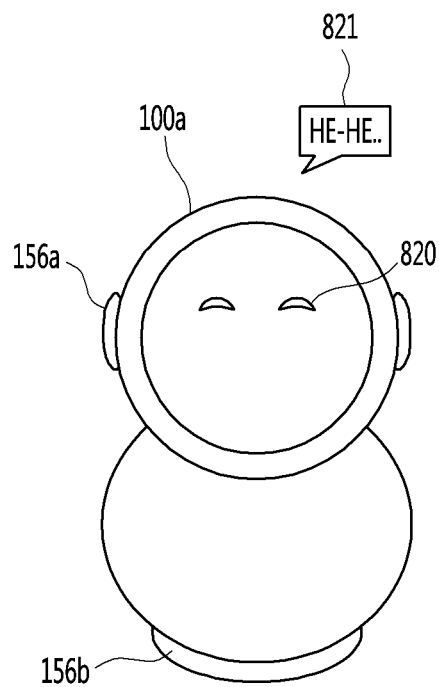

Referring to FIGS. 8a to 8b, a user may apply a first physical stimulus 800 of stroking the head of the robot 100a.

The processor 180 may acquire a sensing value corresponding to the first physical stimulus 800 using the touch sensor 147 provided in correspondence with the head position of the robot 100a, and detect that the first physical stimulus 800 corresponds to "stroking the head of the robot" based on the acquired sensing value.

The processor 180 may determine that a first emotion corresponding to the detected first physical stimulus 800 is a positive emotion (e.g., goodness) based on the information stored in the memory 170, and set the emotion of the robot 100a to the first emotion according to the result of determination.

The processor 180 may output first interfaces 820 and 821 representing the emotional expression based on the set emotion via the output interface 150. As described above, the processor 180 may load any one of at least one piece of emotional expression information corresponding to "goodness" stored in the memory 170, and output a first facial expression screen 820 and first speech 821 via the display 152 and the speaker 154 based on the loaded emotional expression information. The user may recognize that the emotion of the robot 100a corresponds to "goodness" according to the output first interfaces 820 and 821. In some embodiments, the processor 180 may output light having a specific color or pattern via the light output units 156a and 156b when the interface representing the emotional expression is output.

Meanwhile, as the first physical stimulus 800 is detected, the screen 810 of content (or an application) which is being provided via the display 152 may be switched to a first facial expression screen 820. In this case, the content (or the application) may be paused or stopped. When the first physical stimulus 800 is repeatedly detected, the processor 180 may maintain or change the emotion of the robot 100a based on the number of repetitions.

As described above with reference to FIG. 7, when the number of repetitions of the first physical stimulus 800 is less than the first reference number, the processor 180 may maintain the intensity of the set emotion. For example, when the first reference number is 3, the processor 180 may maintain the set emotion as "goodness" until the first physical stimulus 800 is repeatedly detected twice and output an interface representing "goodness" via the output interface 150. At this time, the output interface may be equal to or different from the first interfaces 820 and 821 of FIG. 8b.

Figure 8C:
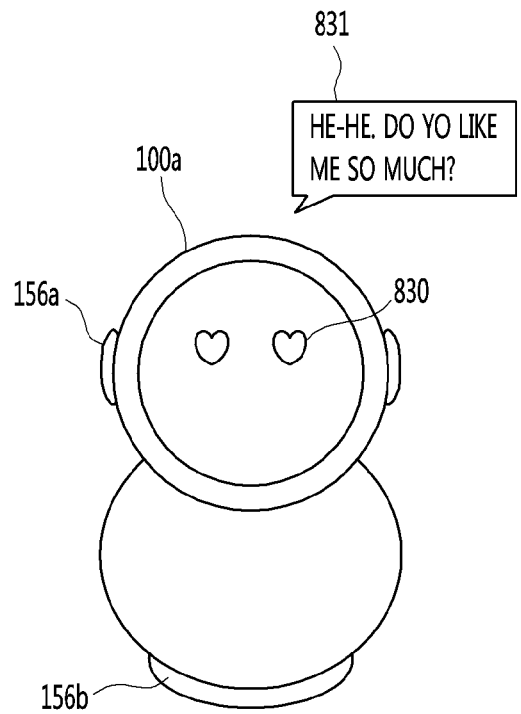

Referring to FIG. 8c, when the number of repetitions of the first physical stimulus 800 is equal to or greater than the first reference number, the processor 180 may increase the intensity of the set emotion. For example, when the first physical stimulus is repeatedly detected three times, the processor 180 may increase the intensity of the positive emotion, by changing the set emotion to "happiness". The processor 180 may load any one of at least one piece of emotional expression information corresponding to the emotion having the increased intensity and output second interfaces 830 and 831 based on the loaded emotional expression information via the output interface 150. For example, the second interfaces 830 and 831 may include a second facial expression screen 830 and second speech 831.

Although not shown, when the number of repetitions of the first physical stimulus 800 continuously increases between the first reference number and the second reference number, the processor 180 may continuously increase the intensity of the set emotion. For example, when the first physical stimulus 800 is repeatedly detected four times, the processor 180 may increase the intensity of the emotion, by changing the set emotion to "ecstasy".

Figure 8D:
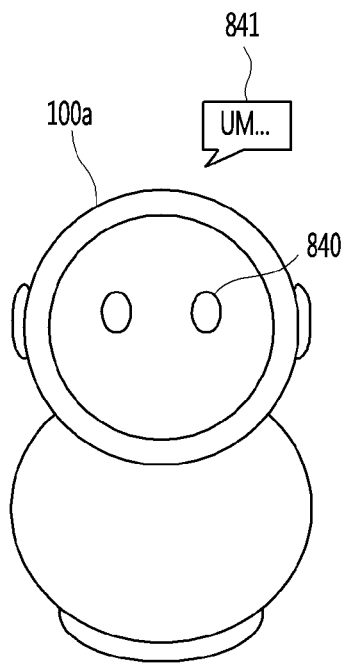

Meanwhile, referring to FIG. 8d, when the number of repetitions of the first physical stimulus 800 increases to be equal to or greater than the second reference number, the processor 180 may gradually decrease the intensity of the set emotion. For example, when the second reference number is 5 and the first physical stimulus 800 is repeatedly detected five times, the processor 180 may decrease the intensity of the set emotion from "ecstasy" to "happiness". The processor 180 may load any one of at least one piece of emotional expression information corresponding to the emotion having the decreased intensity and output an interface based on the loaded emotional expression information via the output interface 150.

When the number of repetitions of the first physical stimulus continuously increases, the processor 180 may continuously decrease the intensity of the set emotion to an emotion corresponding to the neutral state. For example, when the first physical stimulus 800 is repeatedly detected seven times, the processor 180 may decrease the intensity of the emotion, by changing the intensity of the set emotion to the "neutral". The processor 180 may load any one of at least one piece of emotional expression information corresponding to the emotion of "neutral" and output third interfaces 840 and 841 based on the loaded emotional expression information via the output interface 150. For example, the third interfaces 840 and 841 may include a third facial expression screen 840 and third speech 841.

Figure 9A:
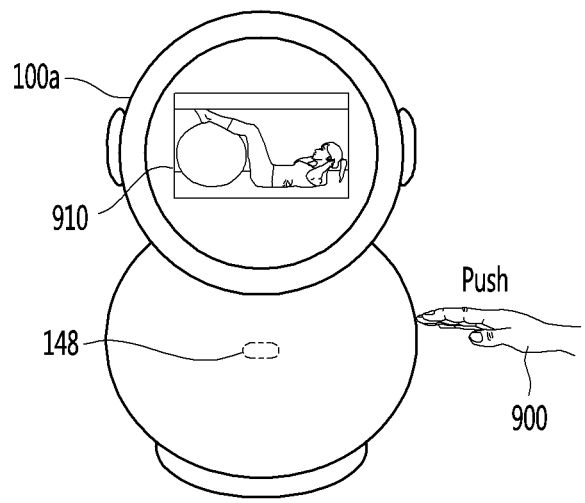
FIGS. 9A to 9D are views showing an example related to operation of the robot shown in FIG. 7.
Figure 9B:
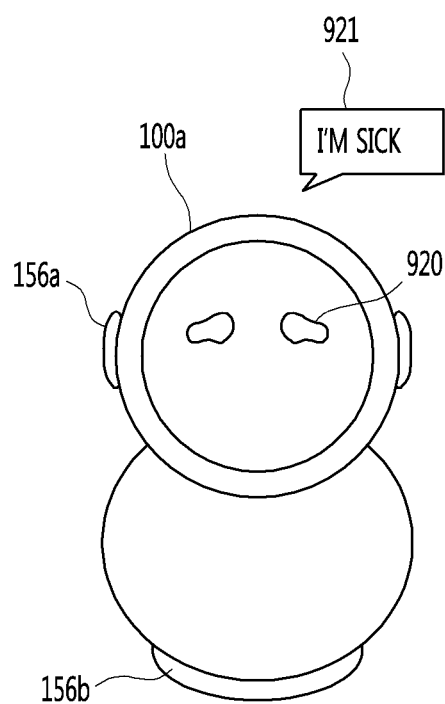

FIGS. 9a to 9d are views showing an example related to operation of the robot shown in FIG. 7. Referring to FIGS. 9a to 9b, a user may apply a second physical stimulus 900 in a manner of pushing the body of the robot 100a. The processor 180 may acquire a sensing value corresponding to the second physical stimulus 900 using the gyro sensor 149 provided in the robot 100a, and detect that the second physical stimulus 900 is "pushing the body of the robot" based on the acquired sensing value.

The processor 180 may determine a second emotion corresponding to the detected second physical stimulus 900 is a negative emotion (e.g., sadness) based on the information stored in the memory 170 and set the emotion of the robot 100a to the second emotion as the result of determination.

The processor 180 may output fourth interfaces 920 and 921 representing the emotional expression based on the set emotion via the output interface 150. As described above, the processor 180 may load any one of at least one piece of emotional expression information corresponding to "sadness" stored in the memory 170, and output a fourth facial expression screen 920 and fourth speech 921 via the display 152 and the speaker 154 based on the loaded emotional expression information. The user may determine that the emotion of the robot 100a corresponds to "sadness" according to the output fourth interfaces 900 and 921.

In some embodiments, the processor 180 may output light having a specific color or pattern via the light output units 156a and 156b when the interface representing the emotional expression is output. Meanwhile, as the second physical stimulus 900 is detected, the screen 910 of content (or an application) which is being provided via the display 152 may be switched to the fourth facial expression screen 920. In this case, the content (or the application) may be paused or stopped.

When the second physical stimulus 900 is repeatedly detected, the processor 180 may maintain or change the emotion of the robot 100a based on the number of repetitions. As described above, when the number of repetitions of the second physical stimulus 900 is less than the preset first reference number, the processor 180 may maintain the intensity of the set emotion. For example, when the first reference number is 3, the processor 180 may maintain the set emotion as "sadness" until the second physical stimulus 900 is repeatedly detected twice and output an interface representing "sadness" via the output interface 150. At this time, the output interface may be equal to or different from the fourth interfaces 920 and 921 of FIG. 9b.

Figure 9C:
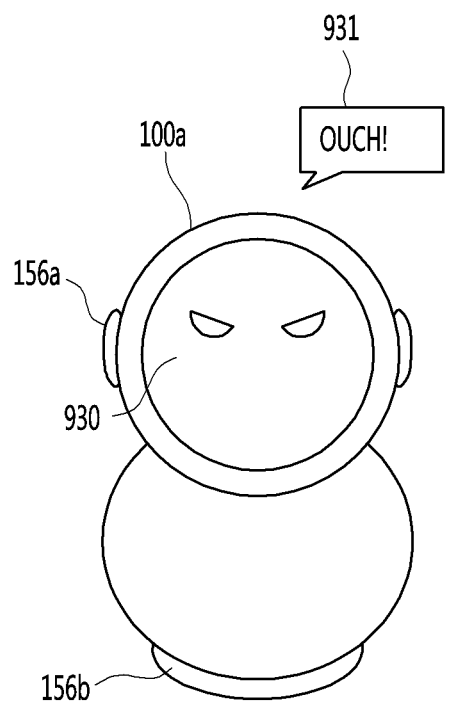

Referring to FIG. 9c, when the number of repetitions of the second physical stimulus 900 is equal to or greater than the first reference number, the processor 180 may increase the intensity of the set emotion. For example, when the first physical stimulus is repeatedly detected three times, the processor 180 may increase the intensity of the negative emotion, by changing the set emotion to "angry". The processor 180 may load any one of at least one piece of emotional expression information corresponding to the emotion having the increased intensity and output fifth interfaces 930 and 931 based on the loaded emotional expression information via the output interface 150.

Although not shown, when the number of repetitions of the second physical stimulus 900 continuously increases between the first reference number and the second reference number, the processor 180 may continuously increase the intensity of the set emotion. For example, when the second physical stimulus 900 is repeatedly detected four times, the processor 180 may increase the intensity of the emotion, by changing the set emotion to "fury".

Figure 9D:
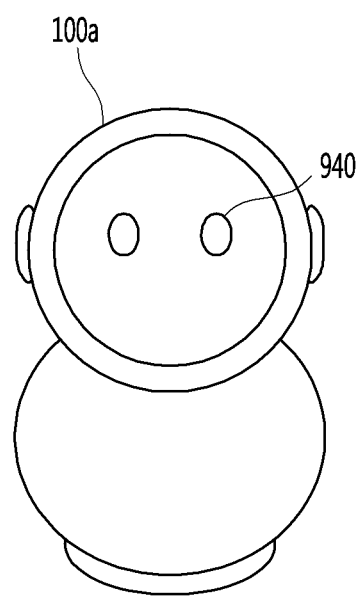

Meanwhile, referring to FIG. 9d, when the number of repetitions of the second physical stimulus 900 increases to be equal to or greater than the second reference number, the processor 180 may gradually decrease the intensity of the set emotion. For example, when the second reference number is 5 and the second physical stimulus 900 is repeatedly detected five times, the processor 180 may decrease the intensity of the set emotion from "fury" to "angry". The processor 180 may load any one of at least one piece of emotional expression information corresponding to the emotion having the decreased intensity and output an interface based on the loaded emotional expression information via the output interface 150.

When the number of repetitions of the second physical stimulus 900 continuously increases, the processor 180 may continuously decrease the intensity of the set emotion to an emotion corresponding to the neutral state. For example, when the second physical stimulus 900 is repeatedly detected seven times, the processor 180 may decrease the intensity of the emotion, by changing the intensity of the set emotion to the "neutral". The processor 180 may load any one of at least one piece of emotional expression information corresponding to the emotion of "neutral" and output a sixth interfaces 940 based on the loaded emotional expression information via the output interface 150.

That is, according to the embodiments shown in FIGS. 7 to 9d, when the same physical stimulus is repeatedly detected, the robot 100a may variously change the emotion according to the number of repetitions of the physical stimulus, instead of outputting a uniform emotional expression. Therefore, the robot 100a can provide a more vivid emotional expression in response to a physical stimulus applied by a user and perform more natural interaction with the user.

Figure 10:
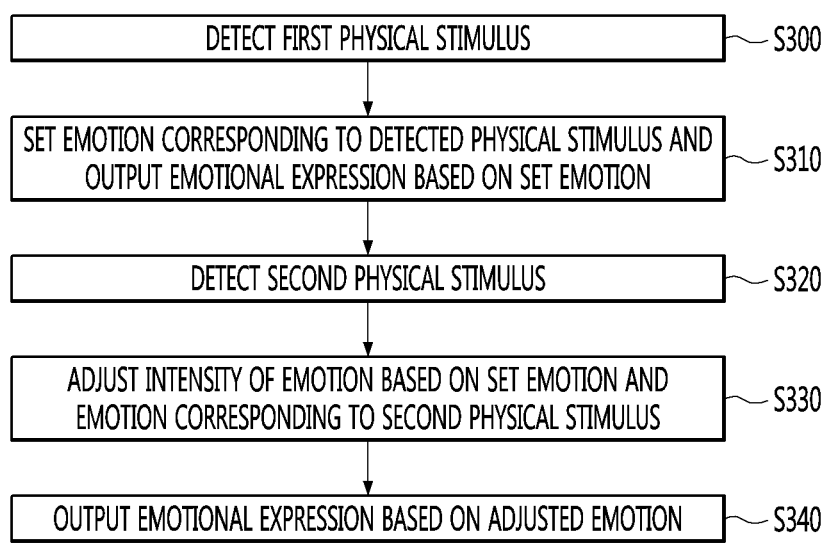
FIG. 10 is a flowchart illustrating operation in which the robot changes an emotion according to accumulation of various stimuli and outputs an emotional expression according to the changed emotion, in association with the control operation shown in FIG. 6.

FIG. 10 is a flowchart illustrating operation in which the robot changes an emotion according to accumulation of various stimuli and outputs an emotional expression according to the changed emotion, in association with the control operation shown in FIG. 6. Referring to FIG. 10, the robot 100a may detect a first physical stimulus (S300), and set an emotion corresponding to the detected first physical stimulus and output the emotional expression based on the set emotion (S310).

Steps S300 to S310 are substantially equal to steps S100 to S110 shown in FIG. 6 and thus a description will be omitted. The robot 100a may detect the second physical stimulus (S320). The processor 180 may detect the second physical stimulus via the physical stimulus detection sensor. The second physical stimulus may be different from the first physical stimulus, without being limited thereto.

The robot 100a may adjust (change) the emotion based on a currently set emotion and an emotion corresponding to the detected second physical stimulus (S330) and output an emotional expression based on the adjusted emotion (S340). When the processor 180 changes the emotion of the robot 100a to the emotion corresponding to the second physical stimulus regardless of the preset emotion, since the emotion of the robot 100a may be rapidly changed, the user may feel unnatural about the emotional expression of the robot 100a.

Accordingly, the processor 180 may improve vividness of the robot 100a, by more naturally changing the emotion of the robot 100a based on a relationship between the currently set emotion and the emotion corresponding to the second physical stimulus (e.g., a characteristic difference, an emotional intensity difference, etc.), instead of changing the emotion of the robot 100a to the emotion corresponding to the detected second physical stimulus.

The processor 180 may change the emotion of the robot 100a to an emotion between the currently set emotion and the emotion corresponding to the second physical stimulus, based on a known emotion model. Alternatively, the processor 180 may change the emotion of the robot 100a, by increasing or decreasing the intensity of the currently set emotion according to the characteristics (e.g., positive or negative) of the currently set emotion and the emotion corresponding to the second physical stimulus. For example, when the currently set emotion is a positive emotion and the emotion corresponding to the second physical stimulus is a negative emotion, the processor 180 may decrease the intensity of the currently set emotion.

Alternatively, the processor 180 may input the currently set emotion and the emotion corresponding to the second physical stimulus to an artificial intelligence based learning model and change the emotion of the robot 100a to the emotion corresponding to a result value output from the learning model.

Meanwhile, in some embodiments, when the currently set emotion and the emotion corresponding to the second physical stimulus are the same, the processor 180 may maintain or change the emotion according to the embodiments of FIGS. 7 to 9d or continuously maintain the currently set emotion. The processor 180 may output an interface (a facial expression screen and/or speech) representing the emotional expression based on the adjusted emotion via the output interface 150. Although not shown, the processor 180 may sequentially detect at least one physical stimulus even after step S340 and adjust the emotion based on the set emotion as in step S330 and the emotion corresponding to the physical stimulus whenever at least one physical stimulus is detected.

Figure 11A:
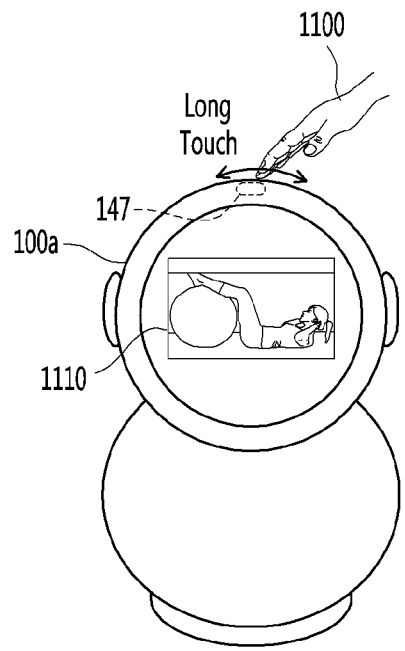
FIGS. 11A to 11D are views showing an example related to operation of the robot shown in FIG. 10.
Figure 11B:
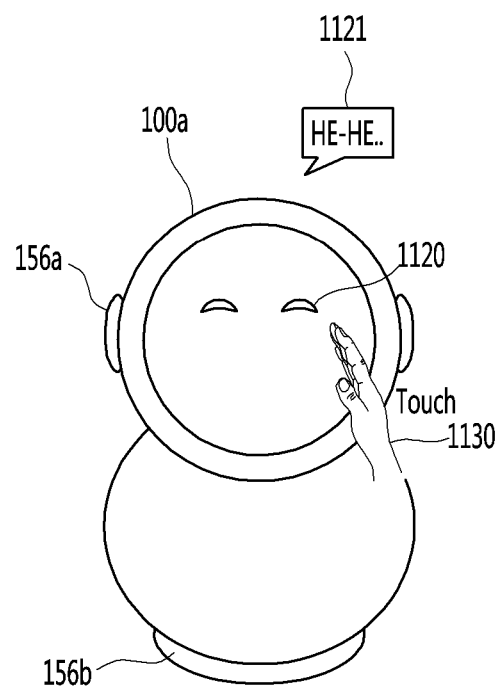

FIGS. 11a to 11d are views showing an example related to operation of the robot shown in FIG. 10. Referring to FIGS. 11a to 11b, as described above with reference to FIGS. 8a to 8b, the processor 180 may detect a first physical stimulus 1100 corresponding to "stroking the head of the robot". The processor 180 may set a first emotion (e.g., goodness) corresponding to the detected first physical stimulus 1100 as the emotion of the robot 100a.

The processor 180 may output first interfaces 1120 and 1121 representing the emotional expression based on the set emotion via the output interface 150. The first interfaces 1120 and 1121 may include a first facial expression screen 1120 and first speech 1121 representing the set emotion (goodness). According to the output of the first facial expression screen 1120, the screen 1110 of content (or an application) which is being provided via the display 152 may be switched to the first facial expression screen 1120 and the content may be paused or stopped.

The processor 180 may detect a second physical stimulus 1130 within a predetermined time from the detection time point of the first physical stimulus 1100. For example, the second physical stimulus 1130 may correspond to "touching the face of the robot" and a second emotion corresponding to the second physical stimulus 1130 may be "fury".

In this case, the processor 180 may set the emotion of the robot 100a based on the currently set emotion (goodness) and the second emotion (fury), without changing the emotion of the robot 100a to the second emotion. Specifically, the processor 180 may check an emotion (e.g., neutral) between the currently set emotion (good) and the second emotion (fury) from a known emotion model, and set the emotion of the robot 100a to the checked emotion. Alternatively, when the currently set emotion is a positive emotion (goodness) and the second emotion is a negative emotion (fury), the processor 180 may decrease the intensity of the currently set emotion and set the emotion (e.g., neutral) having the decreased intensity as the emotion of the robot 100a.

Figure 11C:
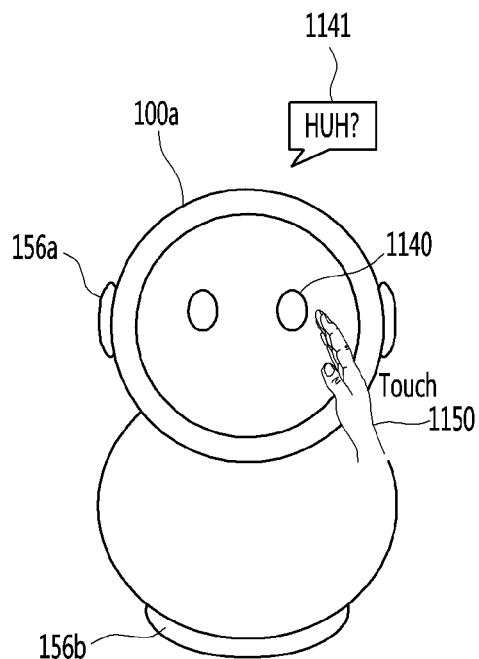
Figure 11D:
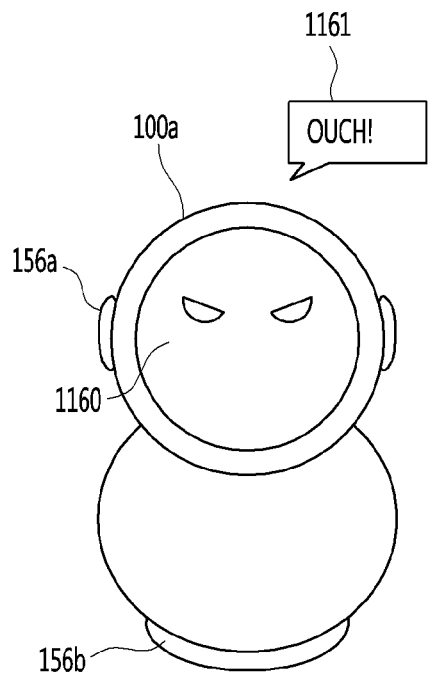

Referring to FIGS. 11c to 11d, the processor 180 may output second interfaces 1140 and 1141 representing the set emotion (neutral) via the output interface 150. Thereafter, the processor 180 may further detect the second physical stimulus 1150.

In the above-described manner, the processor 180 may set the emotion of the robot 100a to "angry" based on the currently set emotion (neutral) and the emotion (fury) corresponding to the second physical stimulus 1150. The processor 180 may output third interfaces 1160 and 1161 representing the set emotion (angry) via the output interface 150.

That is, according to the embodiments shown in FIGS. 10 to 11d, the robot 100a may more naturally change the emotion of the robot 100a based on the currently set emotion and the emotion corresponding to the detected physical stimulus, whenever the physical stimulus is detected. Therefore, it is possible to maximize the vividness of the robot 100a and to perform more natural interaction with the user.

According to the embodiments of the present disclosure, when the same physical stimulus is repeatedly detected, the robot may variously change the emotion according to the number of repetitions of the physical stimulus, instead of outputting a uniform emotional expression. Therefore, the robot can provide a more vivid emotional expression in response to the physical stimulus applied by the user and perform more natural interaction with the user.

In addition, whenever the physical stimulus is detected, the robot can more naturally change the emotion of the robot based on a currently set emotion and the emotion corresponding to the detected physical stimulus. Therefore, it is possible to maximize vividness of the robot and to perform more natural interaction with the user.

An aspect of the present disclosure is to provide a robot capable of expressing various emotions in response to a physical stimulus applied by a user.

Another aspect of the present disclosure is to provide a robot capable of expressing more natural emotional changes in response to repetition of a physical stimulus.

According to an embodiment, a robot includes at least one of a display or a speaker, at least one sensor configured to detect a physical stimulus, and a processor configured to detect a first physical stimulus based on a first sensing value acquired from the at least one sensor and output a first interface representing a first emotion corresponding to the first physical stimulus via at least one of the display or the speaker. The processor is configured to detect repetition of the first physical stimulus based on at least one sensing value sequentially acquired from the at least one sensor and output an interface representing an emotion equal to or different from the first emotion via at least one of the display or the speaker, whenever the repeated first physical stimulus is detected.

In some embodiments, the processor may be configured to check the number of repetitions of the first physical stimulus whenever the repeated first physical stimulus is detected and maintain or change the set emotion based on the checked number of repetitions. In some embodiments, the processor may be configured to output a second interface representing the same emotion as the first emotion via at least one of the display or the speaker, if the checked number of repetitions is less than a first reference number, and the second interface may be equal to or different from the first interface.

In some embodiments, the processor may be configured to output a third interface representing a second emotion having an intensity greater than that of an emotion corresponding to a previously output interface via at least one of the display or the speaker, if the checked number of repetitions is equal to or greater than the first reference number.

In some embodiments, the processor may be configured to output a fourth interface representing a third emotion having an intensity less than that of an emotion corresponding to a previously output interface via at least one of the display or the speaker, if the checked number of repetitions is equal to or greater than a second reference number greater than the first reference number.

In some embodiments, the robot may further include a memory configured to store at least one piece of emotional expression information corresponding to each of a plurality of emotions, the processor may be configured to load any of at least one piece of emotional expression information corresponding to the first emotion from the memory and generate the first interface based on the loaded emotional expression information, and the first interface may include at least one of a facial expression screen output via the display or speech output via the speaker.

In some embodiments, the processor may be configured to initialize an emotion of the robot, if a physical stimulus is not detected via the at least one sensor during a reference time from a detection time point of the first physical stimulus. In some embodiments, the at least one sensor may include at least one of a touch sensor provided at a predetermined position of the robot, a gyroscope sensor or a touch input interface formed on the display.

According to an embodiment, a robot includes at least one of a display or a speaker, at least one sensor configured to detect a physical stimulus, and a processor configured to detect a first physical stimulus based on a first sensing value acquired from the at least one sensor, set a first emotion corresponding to the first physical stimulus as an emotional of the robot and output a first interface representing the set emotion via at least one of the display or the speaker. The processor is configured to detect a second physical stimulus based on a second sensing value acquired from the at least one sensor, maintain or change the set emotion based on the set emotion and a second emotion corresponding to the second physical stimulus and output a second interface representing the maintained or changed emotion via at least one of the display or the speaker.

In some embodiments, the processor may be configured to maintain or change an intensity of the set emotion based on characteristics of the set emotion and characteristics of the second emotion. In some embodiments, the processor may be configured to decrease the intensity of the set emotion, if the set emotion is a positive emotion and the second emotion is a negative emotion.

In some embodiments, the robot may further include a memory configured to store an emotion model representing respective characteristics of and mutual relationship between a plurality of emotions, and the processor may be configured to set a third emotion between the set emotion and the second emotion as the emotion of the robot, based on the emotion model. In some embodiments, the robot may further include a memory configured to store an artificial intelligence based learning model, and the processor may be configured to input data on the set emotion and the second emotion to the learning model and set a third emotion corresponding to a result value output from the learning model as the emotion of the robot.

In certain implementations, a robot comprises: an output device including at least one of a display or a speaker; at least one sensor configured to detect a physical stimulus to the robot; and a processor configured to: control the output device to output a first interface representing a first emotion corresponding to the physical stimulus detected by the at least one sensor, determine when the at least one sensor detects repetitions of the physical stimulus, and control the output device to cease outputting the first interface and to output a second interface representing a second emotion based on the at least one sensor detects the repetitions of the physical stimulus.

The processor may be further configured to: determine a quantity of the repetitions of the physical stimulus, and determine the second emotion based on the quantity of the repetitions of the physical stimulus. The second emotion may correspond to the first emotion when the quantity of the repetitions of the physical stimulus is less than a first reference number. An intensity of the second emotion may be greater than the intensity of the first emotion when the quantity of the repetitions of the physical stimulus is equal to or greater than the first reference number. The intensity of the second emotion may be less than the intensity of the first emotion when the quantity of repetitions of the physical stimulus is equal to or greater than a second reference number greater than the first reference number.

The robot may further comprises a memory configured to store emotional expression information corresponding, respectively, to a plurality of emotions, wherein the processor is configured to generate the first interface based on emotional expression information for the first emotion, and wherein the first interface includes at least one of a facial expression screen or speech for the first emotion.

The processor may be further configured to initialize an emotion of the robot when another physical stimulus is not detected by at least one sensor during a reference time after a detection of a prior physical stimulus. The at least one sensor includes at least one of a touch sensor provided on the robot, a gyroscope sensor, or a touch input interface formed on the display. The physical stimulus may include at least one of a touch, a stroke, a push, or a shaking of at least one position of the robot.

The physical stimulus may be a first physical stimulus, and the at least one sensor is further configured to detect a second physical stimulus, and the processor may be further configured to control the output device to output a third interface representing a third emotion when the at least one sensor detects the second physical stimulus.

In another implementation, a robot comprises an output device including at least one of a display or a speaker; at least one sensor configured to detect a first physical stimulus or a second physical stimulus to the robot; and a processor configured to: control the output device to output a first interface representing a first emotion when the at least one sensor detects the first physical stimulus, and control the output device to output a second interface representing a second emotion when the at least one sensor detects the second physical stimulus.

The processor may be configured to determine an intensity of the second emotion based on characteristics of the first emotion and characteristics of the second emotion. The processor may be configured to decrease the intensity of the second emotion if the first emotion is a positive emotion and the second emotion is a negative emotion.

The robot may further comprise a memory configured to store an emotion model representing respective characteristics of and mutual relationship between a plurality of emotions, wherein the processor is configured to set a third emotion between the first emotion and the second emotion as an emotion of the robot, based on the emotion model.

The robot may further comprise a memory configured to store an artificial intelligence based learning model, wherein the processor is configured to: input data on the first emotion and the second emotion to the learning model, and set a third emotion corresponding to a result value output from the learning model as an emotion of the robot.

The robot may further comprise a memory configured to store emotional expression information corresponding, respectively, to a plurality of emotions, wherein the processor is configured to load first emotional expression information corresponding to the first emotion from the memory and generate the first interface based on the first emotional expression information, and wherein the first interface includes at least one of a facial expression screen or speech. The processor may be further configured to initialize an emotion of the robot when another physical stimulus is not detected via the at least one sensor during a reference time after detecting a prior physical stimulus.

The at least one sensor may include at least one of a touch sensor provided at a predetermined position of the robot, a gyroscope sensor, or a touch input interface formed on the display. The physical stimulus may include at least one of a touch, a stroke, a push, or a shaking of at least one position of the robot. The processor may be further configured to control the output device to output a third interface representing a third emotion when the at least one sensor detects a repeated input of the first physical stimulus or the second physical stimulus.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
   a head;
   a body connected to the head;
   an output device including at least one of a display or a speaker;
   at least one sensor configured to detect a physical stimulus to the robot; and
   a processor configured to:
      control the output device to output a first interface representing a first emotion corresponding to the physical stimulus detected by the at least one sensor,
   wherein at least one sensor includes:
      a first sensor provided in the head; and
      a second sensor provided in the body,
   wherein the processor is further configured to:
      recognize the physical stimulus based on at least one of the first sensor or the second sensor,
      control the output device to output the first interface representing a positive emotion in response to the first sensor detecting the physical stimulus as a stroking of the head of the robot,
      control the output device to output the first interface representing a negative emotion in response to the second sensor detecting the physical stimulus as a pushing of the body of the robot,
      determine when the at least one of the first sensor or the second sensor detects repetitions of the physical stimulus, and
      control the output device to cease outputting the first interface and to output a second interface representing a second emotion, and
   wherein the first interface representing the first emotion and the second interface representing the second emotion are different.

2. The robot of claim 1, wherein the processor is configured to:
   determine a quantity of the repetitions of the physical stimulus, and
   determine the second emotion based on the quantity of the repetitions of the physical stimulus.

3. The robot of claim 2, wherein the second emotion corresponds to the first emotion when the quantity of the repetitions of the physical stimulus is less than a first reference number.

4. The robot of claim 3, wherein an intensity of the second emotion is greater than the intensity of the first emotion when the quantity of the repetitions of the physical stimulus is equal to or greater than the first reference number.

5. The robot of claim 4, wherein the intensity of the second emotion is less than the intensity of the first emotion when the quantity of repetitions of the physical stimulus is equal to or greater than a second reference number greater than the first reference number.

6. The robot of claim 1, further comprising a memory configured to store emotional expression information corresponding, respectively, to a plurality of emotions,
wherein the processor is configured to generate the first interface based on emotional expression information for the first emotion, and
wherein the first interface includes at least one of a facial expression screen or speech for the first emotion.

7. The robot of claim 1, wherein the processor is further configured to initialize an emotion of the robot when another physical stimulus is not detected by the at least one sensor during a reference time after a detection of a prior physical stimulus.

8. The robot of claim 1, wherein the at least one sensor includes at least one of a touch sensor provided on the robot, a gyroscope sensor, or a touch input interface formed on the display.

9. The robot of claim 1, wherein the physical stimulus includes at least one of a touch, a stroke, a push, or a shaking of at least one position of the robot.

10. The robot of claim 1, wherein the physical stimulus is a first physical stimulus, and the at least one sensor is further configured to detect a second physical stimulus, and
wherein the processor is further configured to control the output device to output a third interface representing a third emotion when the at least one sensor detects the second physical stimulus.

11. A robot comprising:
a head;
a body connected to the head;
an output device including at least one of a display or a speaker;
at least one sensor configured to detect a first physical stimulus or a second physical stimulus to the robot, wherein at least one sensor includes:
a first sensor provided in the head; and
a second sensor provided in the body; and
a processor configured to:
recognize the first physical stimulus based on at least one of the first sensor or the second sensor,
control the output device to output a first interface representing a first emotion when the at least one of the first sensor or the second sensor detects the first physical stimulus, wherein the first emotion is a positive emotion in response to the first sensor detecting the physical stimulus as a stroking of the head of the robot, and the first emotion is a negative emotion in response to the second sensor detecting the physical stimulus as a pushing of the body of the robot,
control the output device to output the first interface representing the first emotion,
recognize the second physical stimulus based on one or more of the first sensor or the second sensor, and
control the output device to output a second interface representing a second emotion,
wherein
the second emotion is a negative emotion in response to the second sensor detecting the physical stimulus as a pushing of the body of the robot after the first sensor detects the first physical stimulus, and
the second emotion is a positive emotion in response to the first sensor detecting the physical stimulus as a stroking of the head of the robot after the first sensor detects the first physical stimulus.

12. The robot of claim 11, wherein the processor is configured to determine an intensity of the second emotion based on characteristics of the first emotion and characteristics of the second emotion.

13. The robot of claim 12, wherein the processor is configured to decrease the intensity of the second emotion if the first emotion is a positive emotion and the second emotion is a negative emotion.

14. The robot of claim 11, further comprising a memory configured to store an emotion model representing respective characteristics of and mutual relationship between a plurality of emotions,
wherein the processor is configured to set a third emotion between the first emotion and the second emotion as an emotion of the robot, based on the emotion model.

15. The robot of claim 11, further comprising a memory configured to store an artificial intelligence based learning model,
wherein the processor is configured to:
input data on the first emotion and the second emotion to the learning model, and
set a third emotion corresponding to a result value output from the learning model as an emotion of the robot.

16. The robot of claim 11, further comprising a memory configured to store emotional expression information corresponding, respectively, to a plurality of emotions,
wherein the processor is configured to load first emotional expression information corresponding to the first emotion from the memory and generate the first interface based on the first emotional expression information, and
wherein the first interface includes at least one of a facial expression screen or speech.

17. The robot of claim 11, wherein the processor is further configured to initialize an emotion of the robot when another physical stimulus is not detected via the at least one sensor during a reference time after detecting a prior physical stimulus.

18. The robot of claim 11, wherein the at least one sensor includes at least one of a touch sensor provided at a predetermined position of the robot, a gyroscope sensor, or a touch input interface formed on the display.

19. The robot of claim 11, wherein at least one of the first physical stimulus or the second physical stimulus includes at least one of a touch, a stroke, a push, or a shaking of at least one position of the robot.

20. The robot of claim 11, wherein the processor is further configured to control the output device to output a third interface representing a third emotion when the at least one sensor detects a repeated input of the first physical stimulus or the second physical stimulus.

* * * * *